(12) United States Patent
Ichikawa et al.

(10) Patent No.: US 11,480,442 B2
(45) Date of Patent: Oct. 25, 2022

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Shinji Ichikawa, Nagoya (JP); Harunobu Saito, Nagoya (JP); Daiki Kaneichi, Nisshin (JP); Ryotaro Fujiwara, Tokyo-to (JP); Megumi Amano, Toyota (JP); Masato Endo, Nagakute (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 16/557,196

(22) Filed: Aug. 30, 2019

(65) Prior Publication Data
US 2020/0072634 A1 Mar. 5, 2020

(30) Foreign Application Priority Data
Aug. 31, 2018 (JP) .............................. JP2018-163308

(51) Int. Cl.
| | |
|---|---|
| *G01C 21/36* | (2006.01) |
| *H04W 4/40* | (2018.01) |
| *H04W 4/029* | (2018.01) |
| *H04W 4/024* | (2018.01) |

(52) U.S. Cl.
CPC ..... *G01C 21/3641* (2013.01); *G01C 21/3617* (2013.01); *H04W 4/029* (2018.02); *H04W 4/40* (2018.02); *H04W 4/024* (2018.02)

(58) Field of Classification Search
None
See application file for complete search history.

(56) References Cited

U.S. PATENT DOCUMENTS

| | | | |
|---|---|---|---|
| 9,293,042 B1* | 3/2016 | Wasserman | G08G 1/09 |
| 2008/0089288 A1* | 4/2008 | Anschutz | H04W 4/02 370/331 |
| 2011/0113338 A1* | 5/2011 | Aoki | G11B 27/034 715/730 |
| 2013/0130777 A1 | 5/2013 | Lemay et al. | |
| 2018/0293617 A1* | 10/2018 | Pittman | G06Q 30/0267 |

FOREIGN PATENT DOCUMENTS

| | | |
|---|---|---|
| JP | 2011-101287 A | 5/2011 |
| JP | 2014-182027 A | 9/2014 |
| JP | 2017-033103 A | 2/2017 |
| JP | 2017-211851 A | 11/2017 |

* cited by examiner

*Primary Examiner* — Anne Marie Antonucci
*Assistant Examiner* — Kyle S Park
(74) *Attorney, Agent, or Firm* — Oliff PLC

(57) ABSTRACT

An output apparatus arranged on a traveling route of a user is allowed to timely output information desired by the user. The information processing apparatus according to the present disclosure is an information processing apparatus to be used by a mobile user, the information processing apparatus comprising a controller which executes acquisition of a content designated by the user; specification of an output apparatus arranged on a traveling route of the user; and transmission of the acquired content to the specified output apparatus.

7 Claims, 8 Drawing Sheets

| USER NAME | PASSWORD |
|---|---|
| USER1 | PASS1 |
| ⋮ | ⋮ |

INFORMATION PROCESSING APPARATUS, INFORMATION PROCESSING METHOD, AND NON-TRANSITORY STORAGE MEDIUM

CROSS REFERENCE TO RELATED APPLICATION

This application claims the benefit of Japanese Patent Application No. 2018-163308, filed on Aug. 31, 2018, which is hereby incorporated by reference herein in its entirety.

BACKGROUND

Technical Field

The present disclosure relates to an information processing apparatus, an information processing method, and a non-transitory storage medium.

Description of the Related Art

A digital signage, which outputs information, is utilized. For example, Patent Literature 1 suggests such a guide server that guidance information, which is composed of destination information and information relevant to a positional relationship with respect to a destination, is generated and transmitted to a digital signage.

PRIOR ART LITERATURE

Patent Literature

Patent Literature 1: Japanese Patent Application Laid-Open No. 2014-182027

SUMMARY

An object of one aspect of the disclosed technique is to provide an information processing apparatus, an information processing method, and a non-transitory storage medium which make it possible to allow an output apparatus arranged on a traveling route of a user to timely output information desired by the user.

A first aspect of the disclosed technique resides in an information processing apparatus to be used by a mobile user; the information processing apparatus comprising a controller which executes acquisition of a content designated by the user; specification of an output apparatus arranged on a traveling route of the user; and transmission of the acquired content to the specified output apparatus.

A second aspect of the disclosed technique resides in an information processing method executed by an information processing apparatus to be used by a mobile user; the information processing method comprising acquiring a content designated by the user; specifying an output apparatus arranged on a traveling route of the user; and transmitting the acquired content to the specified output apparatus.

A third aspect of the disclosed technique resides in a non-transitory storage medium stored with an information processing program for allowing an information processing apparatus to be used by a mobile user to execute acquisition of a content designated by the user;
specification of an output apparatus arranged on a traveling route of the user; and transmission of the acquired content to the specified output apparatus.

According to the disclosed technique, it is possible to allow a digital signage to timely display information desired by a user.

BRIEF DESCRIPTION OF THE DRAWINGS

FIG. 7 shows an exemplary authentication table stored in an authentication database.

DESCRIPTION OF THE EMBODIMENTS

Figure 1:
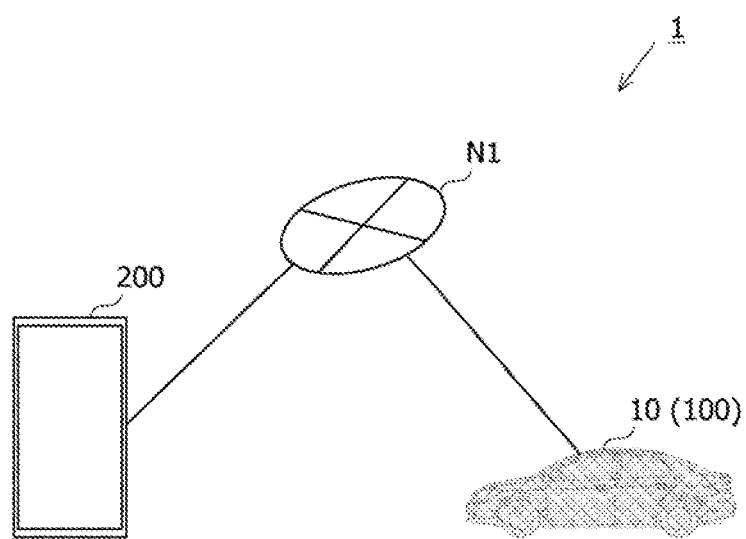
FIG. 1 shows an exemplary content output system according to a first embodiment.

A digital signage, which outputs information, is utilized. In the case of the digital signage, for example, advertisements of enterprises and information about regions are delivered. The digital signage can output various pieces of information. However, such a method of use has not been established that any content desired by a user is timely outputted.

In the embodiment of the present disclosure, an explanation will be made about an information processing apparatus which allows a digital signage to timely output a content desired by a user.

The information processing apparatus according to the embodiment of the present disclosure resides in an information processing apparatus to be used by a mobile user; the information processing apparatus comprising a controller which executes acquisition of a content designated by the user; specification of an output apparatus arranged on a traveling route of the user; and transmission of the acquired content to the specified output apparatus.

In the disclosed technique, there is no limitation on the data format of the content. The data format of the content is, for example, image data, moving image data, voice data, and text data. Further, in the disclosed technique, there is no limitation on details of the content. Details of the content are, for example, live sports broadcast, drama, news, movie, music, animation and the like. Further, details of the content may be messages from a vehicle which is used by the user to other vehicles. As for the acquisition of the content, for example, the controller may acquire the content from a storage apparatus or device capable of communicating with the information processing apparatus by means of a computer network. Further, as for the acquisition of the content, a storage unit, which is provided for the information processing apparatus, may previously store the content, and the controller may acquire the content from the storage unit. Further, as for the acquisition of the content, text information, which is inputted by the user, may be acquired by the aid of an input/output unit of the information processing apparatus.

As an example of the output apparatus arranged on the traveling route, it is possible to exemplify a speaker and a digital signage arranged on the street. As for the specification of the output apparatus arranged on the traveling route, an output apparatus, which is included in the output apparatuses arranged on the traveling route of the user and which can make communication with the information processing apparatus, may be specified. Alternatively, an output apparatus, which is arranged in a traveling direction of the user, may be specified. Further alternatively, an output apparatus, which is arranged at a position nearest to the user, may be specified. The information processing apparatus may transmit the acquired content to the specified output apparatus. The user can easily view (see and hear) the content outputted by the output apparatus, for example, by transmitting the content by the information processing apparatus and allowing the output apparatus to output the same, the output apparatus being the output apparatus which is arranged in the traveling direction of the user and/or the output apparatus which is arranged at the position near to the user. In the disclosed technique, the content is directly transmitted from the information processing apparatus to the output apparatus. Therefore, the output apparatus can be allowed to output the content more timely as compared with such a case that a server, which receives a request of transmission of a content from an information processing apparatus, transmits the content to the output apparatus.

In the disclosed technique, the specified output apparatus may output the content if the output apparatus succeeds in authentication of the user; and the controller may transmit authentication information to be used for the authentication of the user, to the specified output apparatus. When the technique has the feature as described above, the output apparatus can thereby perform the authentication of the user on the basis of the received authentication information. Therefore, the information processing apparatus can allow the output apparatus to control the presence or absence of the output of the content on the basis of whether the authentication is right or wrong.

In the disclosed technique, if the user passes through the specified output apparatus, the controller may stop the transmission of the acquired content to the specified output apparatus. When the technique has the feature as described above, it is thereby possible to suppress the output to the output apparatus arranged at such a position that it is difficult for the user to visually recognize the output apparatus.

In the disclosed technique, if the acquired content is a content stored in a storage unit by making reference to the storage unit which stores a list of contents for which output is suppressed, the controller may suppress the transmission of the acquired content to the output apparatus. Further, for example, if the acquired content is a content stored in a storage unit by making reference to the storage unit which stores a list of contents for which output is suppressed, the controller may change at least a part of the acquired content. The process, in which at least a part of the content is changed, is exemplified, for example, by the image processing including, for example, a mask process and a mosaic process for a part of the moving image or the image and the voice erasing processing for a part of the voice data. The part to be changed is, for example, a part which is included in the content to be outputted and which is inadequate for any person other than the user to view (see and hear) the same.

When the technique has the feature as described above, for example, it is thereby possible to suppress any other person from viewing (seeing and hearing) the content which is inadequate for any person other than the user to view (see and hear) the same. For example, a content, which is inadequate for children to view (see and hear) the same, is suppressed from being outputted on the school route (street for students going to and from school).

The disclosed technique explained above can be also grasped as aspects of an information processing method, an information processing program, and a non-transitory storage medium.

An explanation will be made in further detail below with reference to the drawings about an embodiment of the disclosed technique. The configuration of the embodiment described below is exemplified by way of example. The disclosed technique is not limited to the configuration of the embodiment.

First Embodiment

FIG. 1 shows an exemplary content output system according to a first embodiment. The content output system 1 according to the first embodiment comprises a vehicle onboard apparatus 100 carried on a vehicle 10 and a signage 200. The vehicle onboard apparatus 100 and the signage 200 are connected to one another by means of a network N1.

The vehicle 10 is an automobile driven by a user. The vehicle 10 is provided with the vehicle onboard apparatus 100. The vehicle onboard apparatus 100 is an information processing apparatus carried on the vehicle 10. The vehicle onboard apparatus 100 transmits, for example, a content designated by the user to the signage 200. A car navigation system, which utilizes the Global Positioning System (GPS), is included. The vehicle onboard apparatus 100 can acquire the present position of the vehicle 10 by means of GPS.

The signage 200 is a display apparatus having a display. The type of the display of the signage 200 is not specifically limited. The display, which can be adopted by the signage 200, includes, for example, Liquid Crystal Display (LCD), Plasma Display Panel (PDP), Electroluminescence (EL) panel, and organic EL panel. The signage 200 displays the content received from the vehicle onboard apparatus 100.

<Hardware Configuration>

Figure 2:
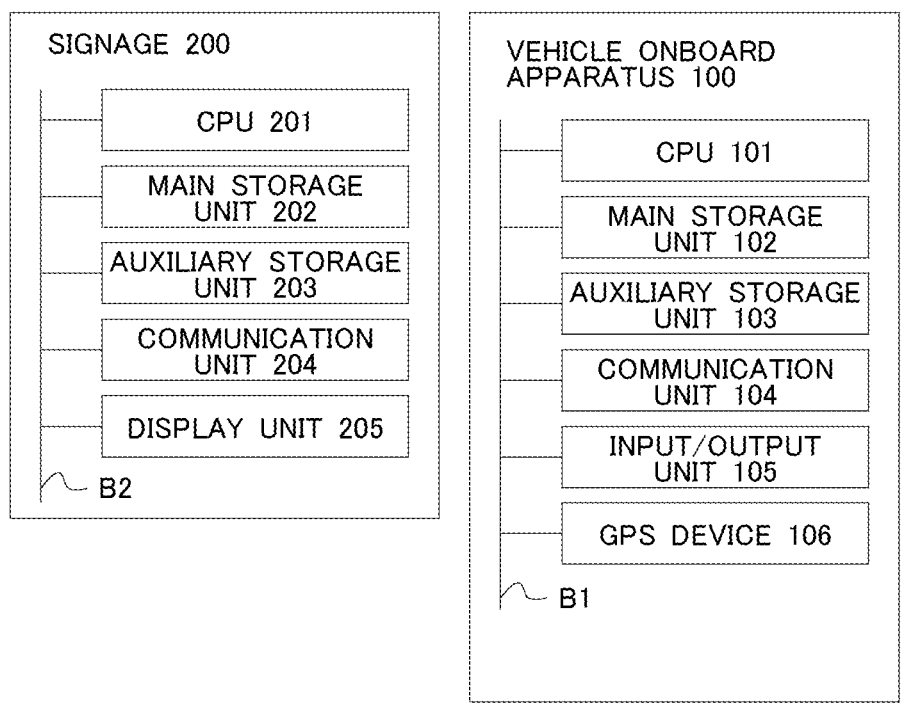
FIG. 2 shows exemplary hardware configuration of the content output system according to the first embodiment.

FIG. 2 shows exemplary hardware configuration of the content output system according to the first embodiment. FIG. 2 exemplifies the hardware configuration of the vehicle onboard apparatus 100 and the signage 200 of the content output system 1 by way of example.

(Vehicle Onboard Apparatus)

The vehicle onboard apparatus 100 is provided with a Central Processing Unit (CPU) 101, a main storage unit 102, an auxiliary storage unit 103, a communication unit 104, an input/output unit 105, and a GPS device 106. CPU 101, the main storage unit 102, the auxiliary storage unit 103, the communication unit 104, the input/output unit 105, and the GPS device 106 are connected to one another by means of a connecting bus B1.

CPU 101 is also referred to as "microprocessor unit (MPU)" or "processor". CPU 101 is not limited to a single processor. CPU 101 may be constructed as a multiprocessor. Further, single CPU 101, which is connected by a single socket, may have multicore configuration. At least a part of the process executed by CPU 101 may be performed by any processor other than CPU 101, for example, by any exclusive processor including, for example, a Digital Signal Processor (DSP), a Graphics Processing Unit (GPU), a numeric data processor, a vector processor, and an image processing processor. Further, at least a part of the process executed by CPU 101 may be performed by any integrated circuit (IC) or any other digital circuit. Further, an analog circuit may be included in at least a part of CPU 101. The integrated circuit includes a Large Scale Integrated circuit (LSI), Application Specific Integrated Circuit (ASIC), and a programmable logic device (PLD). PLD includes, for example, a Field-Programmable Gate Array (FPGA). CPU 101 may be a combination of the processor and the integrated circuit. The combination is referred to, for example, as "microcontroller unit (MCU)", "System-on-a-chip (SoC)", "system LSI", or "chip set". In the vehicle onboard apparatus 100, the program, which is stored in the auxiliary storage unit 103, is developed by CPU 101 to the operation area of the main storage unit 102, and peripheral apparatuses or devices are controlled in accordance with the execution of the program. Accordingly, the vehicle onboard apparatus 100 can execute the process which conforms to the predetermined purpose. The main storage unit 102 and the auxiliary storage unit 103 are storage media capable of being read by the vehicle onboard apparatus 100.

The main storage unit 102 is exemplified as a storage unit which is directly accessed by CPU 101. The main storage unit 102 includes a Random Access Memory (RAM) and a Read Only Memory (ROM).

The auxiliary storage unit 103 readably/writably stores various programs and various data on the recording medium. The auxiliary storage unit 103 is also referred to as "external storage device". For example, an operating system (Operating System, OS), various programs, and various tables are stored in the auxiliary storage unit 103. OS includes a communication interface program to accept/deliver the data with respect to, for example, any external apparatus or device connected via the communication unit 104. The external apparatus or device or the like includes, for example, any other information processing apparatus and an external storage apparatus or device connected, for example, by a computer network.

The auxiliary storage unit 103 is, for example, an Erasable Programmable ROM (EPROM), a solid state drive (Solid State Drive, SSD), or a hard disk drive (Hard Disk Drive, HDD). Further, the auxiliary storage unit 103 is, for example, a Compact Disc (CD) drive device, a Digital Versatile Disc (DVD) drive device, or a Blu-ray (registered trademark) Disc (BD) drive device.

The communication unit 104 is, for example, an interface with respect to the network Ni. The communication unit 104 makes communication with the external apparatus or device by the aid of the network Ni.

The input/output unit 105 includes an input unit which accepts, for example, an operation instruction, for example, from a user and an output unit which outputs a result of calculating process performed by CPU 101. The input unit is, for example, a keyboard, a pointing device, a touch panel, or a voice input device. The output unit is, for example, a CRT display, LCD, PDP, an EL panel, an organic EL panel, or a speaker.

The GPS device 106 acquires the present position of the vehicle 10 by utilizing the global positioning system. The present position of the vehicle 10 is indicated, for example, by the latitude and the longitude.

(Signage)

The signage 200 is provided with CPU 201, a main storage unit 202, an auxiliary storage unit 203, a communication unit 204, and a display unit 205. CPU 201, the main storage unit 202, the auxiliary storage unit 203, and the communication unit 204 are connected to one another by means of a connecting bus B2. CPU 201, the main storage unit 202, the auxiliary storage unit 203, and the communication unit 204 are the same as or equivalent to CPU 101, the main storage unit 102, the auxiliary storage unit 103, and the communication unit 104 of the vehicle onboard apparatus 100 respectively, any explanation of which will be omitted. The display unit 205 is, for example, a CRT display, LCD, PDP, an EL panel, an organic EL panel, or a speaker. The signage 200 is arranged, for example, aside the road, i.e., on the traveling route of the vehicle 10.

<Logical Configuration>

Figure 3:
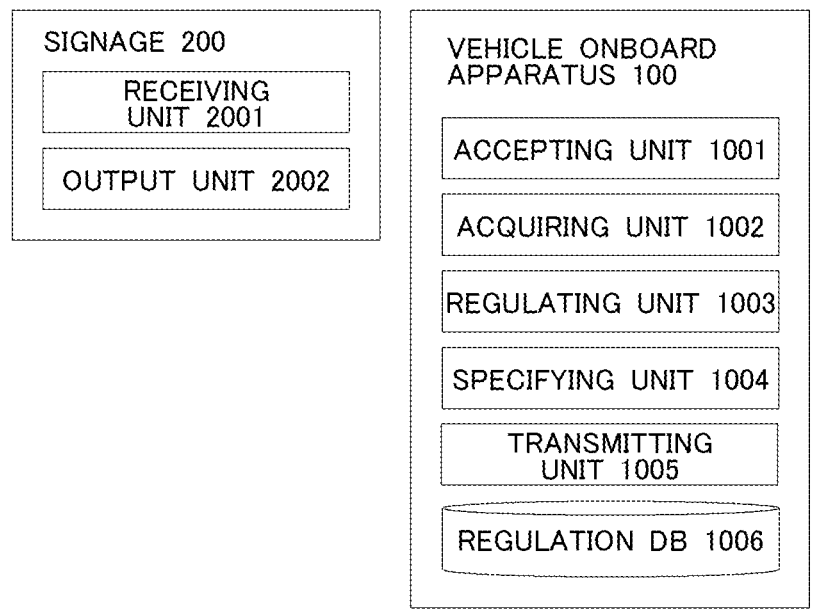
FIG. 3 shows exemplary logical configuration of the content output system according to the first embodiment.

FIG. 3 shows exemplary logical configuration of the content output system according to the first embodiment. The logical configuration of the content output system 1 will be explained below with reference to FIG. 3.

(Vehicle Onboard Apparatus)

As for the vehicle onboard apparatus 100, CPU 101 reads and executes the program stored in the auxiliary storage unit 103 on the main storage unit 102, and thus an accepting unit 1001, an acquiring unit 1002, a regulating unit 1003, a specifying unit 1004, a transmitting unit 1005, and a regulation database (referred to as "DB" in the drawing) 1006 are realized.

Figure 4:
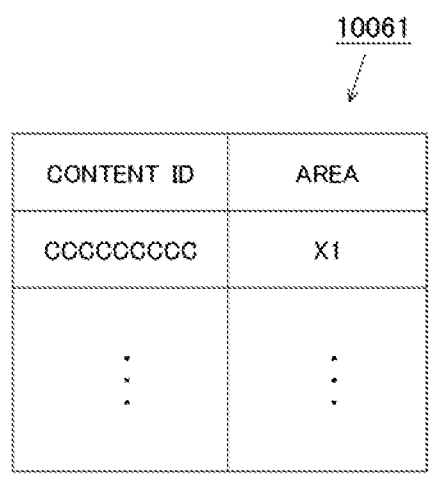
FIG. 4 shows an exemplary regulation content table stored in a regulation database.

FIG. 4 shows an exemplary regulation content table stored in the regulation database. The regulation content table 10061 of the regulation database 1006 includes respective items of "content ID" and "area". Information, which unambiguously distinguishes the content, is stored in "content ID". The information, which unambiguously distinguishes the content, may be, for example, Uniform Resource Locator (URL) for indicating location of the content, file name, or file path name. Further, information, which indicates the content, may be a hash value of an electronic file including the content. The hash value is calculated in accordance with, for example, the hash function such as Message Digest Algorithm (MD) 5, Secure Hash Algorithm (SHA)-1, and SHA-256. Information, which indicates the area for regulating the output of the content, is stored in "area". Information, which indicates the area of the vehicle 10, is, for example, the latitude and the longitude. The regulation database 1006 is an example of "storage unit which stores a list of contents for which output is suppressed".

With reference to FIG. 3 again, the accepting unit 1001 accepts the designation of the content from the user. For example, the accepting unit 1001 accepts the designation of the content from the user by the aid of the input/output unit 105. The designation of the content includes information which indicates the location of the content. The information, which indicates the location of the content, is, for example, URL, file name, or file path name.

The acquiring unit 1002 acquires the content designated by the user. For example, if the accepting unit 1001 accepts URL, then the acquiring unit 1002 may specify the location of the content by means of the URL, and the acquiring unit 1002 may acquire the content for which the location has been specified.

The regulating unit 1003 makes reference to the regulation content table 10061 of the regulation database 1006 to judge whether or not the content acquired by the acquiring unit 1002 is the regulation target. The regulating unit 1003 acquires, for example, the area correlated with the acquired content, in the regulation content table 10061. The regulating unit 1003 judges whether or not the acquired content is the regulation target, on the basis of the area correlated with the acquired content and the present position of the vehicle 10 acquired by the GPS device 106. In other words, if the present position of the vehicle 10 acquired by the GPS device 106 is included in the area correlated with the acquired content, it is judged that the content is the regulation target. If the regulating unit 1003 judges that the content is the regulation target, the user may be informed of that effect.

The specifying unit 1004 specifies the signage 200 which is designated as the transmission destination of the content. For example, if one signage 200 is arranged in the range in which the communication can be made with the vehicle onboard apparatus 100, the specifying unit 1004 specifies the signage 200 as the transmission destination of the content. Whether or not the signage 200 exists in the range in which the communication can be made can be judged, for example, depending on whether or not any response signal with respect to a beacon can be received from the signage 200 after transmitting the beacon by the vehicle onboard apparatus 100.

Further, for example, if a plurality of signages 200 are arranged in the range in which the communication can be made with the vehicle onboard apparatus 100, the specifying unit 1004 can specify the signage 200 designated as the transmission destination of the content, on the basis of various criteria. For example, the signage 200, which is included in the plurality of arranged signages 200 and which is arranged at a position nearest to the vehicle onboard apparatus 100, may be specified as the transmission destination of the content by the specifying unit 1004. The signage 200, which is arranged at the nearest position, is, for example, the signage 200 which has the strongest signal intensity of the response signal with respect to the beacon.

Further, for example, the signage 200, which is included in the plurality of arranged signages 200 and which is arranged in the traveling direction of the vehicle 10, may be specified as the transmission destination of the content by the specifying unit 1004. As for the signage 200 arranged in the traveling direction, the distance between the signage 200 and the vehicle 10 is shortened in accordance with the travel of the vehicle 10. It is conceived that the signal intensity of the response signal detected by the vehicle 10 is strengthened. Therefore, for example, the signage 200, in which the signal intensity of the response signal is gradually strengthened in accordance with the travel of the vehicle 10, can be exemplified as the signage 200 which is arranged in the traveling direction of the vehicle 10.

The transmitting unit 1005 transmits the content acquired by the acquiring unit 1002 to the signage 200 specified by the specifying unit 1004. The transmission is performed, for example, by means of the streaming. Note that the content, which is designated as the regulation target by the regulating unit 1003, is not transmitted to the signage 200 by the transmitting unit 1005. If the vehicle 10 passes through the signage 200 as the transmission destination of the content, the transmitting unit 1005 may stop the transmission of the content to the signage 200. If the specifying unit specifies the next signage 200 after stopping the transmission of the content to the signage 200, the transmitting unit 1005 may transmits a continuation or rest of the content to the next signage 200. The vehicle onboard apparatus 100 is an example of "information processing apparatus".

(Signage)

As for the signage 200, CPU 201 reads and executes the program stored in the auxiliary storage unit 203 on the main storage unit 202, and thus a receiving unit 2001 and an output unit 2002 are realized. The receiving unit 2001 receives the content from the vehicle onboard apparatus 100 by the aid of the communication unit 204. The output unit 2002 allows the display unit 205 to display the content received by the receiving unit 2001. The signage 200 is an example of "output apparatus".

<Exemplary Processing>

Figure 5:
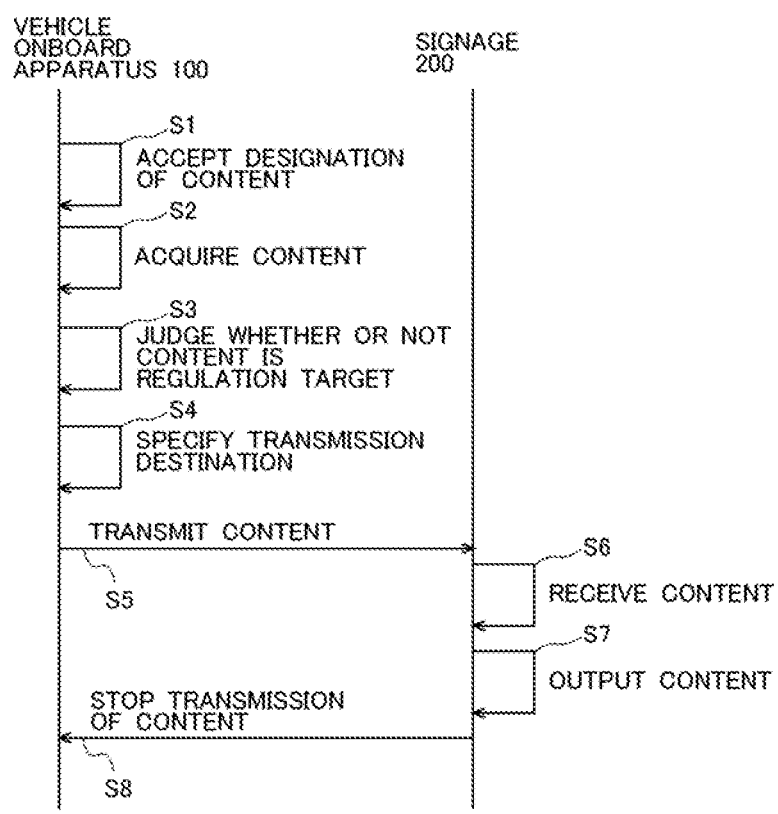
FIG. 5 shows an exemplary processing sequence of the content output system according to the first embodiment.

FIG. 5 shows an exemplary processing sequence of the content output system according to the first embodiment. An explanation will be made below with reference to FIG. 5 about the exemplary processing sequence of the content output system 1.

In S1, the accepting unit 1001 of the vehicle onboard apparatus 100 accepts the designation of the content from the user. The designation of the content is accepted, for example, by designating the location of the content by the information of URL or the like.

In S2, the acquiring unit 1002 acquires the content designated in S1. The process of S2 is an example of "acquisition of a content designated by the user". In S3, the regulating unit 1003 judges whether or not the content acquired in S2 is the regulation target. The regulating unit 1003 judges whether or not the content acquired in S2 is the regulation target, for example, by making reference to the regulation content table 10061 of the regulation database 1006. The process of S3 is an example of "if the acquired content is a content stored in a storage unit by making reference to the storage unit which stores a list of contents for which output is suppressed, the controller suppresses the transmission of the acquired content to the output apparatus".

In S4, the specifying unit 1004 specifies the signage 200 which is designated as the transmission destination of the content. If a plurality of signages 200 are arranged in a range in which the communication can be made with the vehicle onboard apparatus 100, for example, the specifying unit 1004 specifies the signage 200 arranged in the traveling direction of the vehicle 10, as the transmission destination of the content. The process of S4 is an example of "specification of an output apparatus arranged on a traveling route of the user". The process of S4 is also an example of "if a plurality of output apparatuses, which are arranged on the traveling route of the user, are present, the controller specifies the output apparatuses arranged in a traveling direction of the user".

In S5, the transmitting unit 1005 transmits the content acquired in S2 to the signage 200 specified in S4. The transmitting unit 1005 continues the transmission of the content to the signage 200 by means of the streaming during the period until the transmission of the content is stopped in S8. Note that if it is judged in S3 that the content acquired in S2 is the regulation target, the transmitting unit 1005 does not perform the transmission of the content acquired in S2. The process of S5 is an example of "transmission of the acquired content to the specified output apparatus".

In S6, the receiving unit 2001 of the signage 200 receives the content transmitted from the vehicle onboard apparatus 100. In S7, the output unit 2002 of the signage 200 allows the display unit 205 to display the content received in S6.

In S8, the vehicle 10 has passed through the signage 200 specified in S4. The transmitting unit 1005 of the vehicle onboard apparatus 100 stops the transmission of the content to the signage 200 specified in S4. The process of S8 is an example of "if the user passes through the specified output apparatus, the controller stops the transmission of the acquired content to the specified output apparatus".

Note that if the specifying unit 1004 detects the signage 200 arranged in a range in which the communication can be made with the vehicle onboard apparatus 100, after the passage through the signage 200 specified in S4, then the process may return to S4, and a continuation or rest of the content may be transmitted to the signage 200 specified subsequently.

<Function and Effect of First Embodiment>

According to the first embodiment, the vehicle onboard apparatus 100 transmits the content to the signage 200 arranged in the range in which the communication can be made, and the signage 200 outputs the content received from the vehicle onboard apparatus 100. The content is directly transmitted from the vehicle onboard apparatus 100 to the signage 200, and hence the signage 200 can be allowed to output the content more timely as compared with such a case that any server, which receives a request to transmit the content from the vehicle onboard apparatus 100, transmits the content to the signage 200.

In the process flow shown in FIG. 5, the signage 200, which is included in the signages capable of communicating with the vehicle onboard apparatus 100 and which is arranged in the traveling direction of the vehicle 10, is specified as the transmission destination of the content. It is affirmed that the signage 200, which is arranged in the traveling direction of the vehicle 10, is positioned in the forward direction for the user of the vehicle 10. Therefore, the content can be outputted by the signage 200 which can be easily viewed from the user of the vehicle 10.

Note that the signage 200, which is specified as the transmission destination of the content, is not necessarily limited to the signage 200 which is arranged in the traveling direction of the vehicle 10. The specifying unit 1004 may specify, for example, the signage 200 which is arranged at a position nearest to the vehicle 10, as the transmission destination of the content. It is easy for the user of the vehicle 10 to read the content by outputting the content by the nearest signage 200. Further, for example, when a message is sent from the vehicle 10 to another vehicle, if the signage 200 arranged at a position nearest to the vehicle 10 is allowed to output the message, then a user of the another vehicle can thereby easily recognize that the message is the message sent from the vehicle 10. The specification of the signage 200 arranged at the position nearest to the vehicle 10 as the transmission destination of the content is an example of "if a plurality of output apparatuses, which are arranged on the traveling route of the user, are present, the controller specifies the output apparatus arranged at a position nearest to the user".

Second Embodiment

In the first embodiment, if the content is transmitted from the vehicle onboard apparatus 100, the signage 200 outputs the content. In the second embodiment, the signage 200 performs an authentication process on the basis of authentication information transmitted from the vehicle onboard apparatus 100. Then, if the signage 200 succeeds in the authentication, the signage 200 outputs the content. This configuration will be explained below. Components or parts, which are the same as those of the first embodiment, are designated by the same reference numerals, any explanation of which will be omitted.

Figure 6:
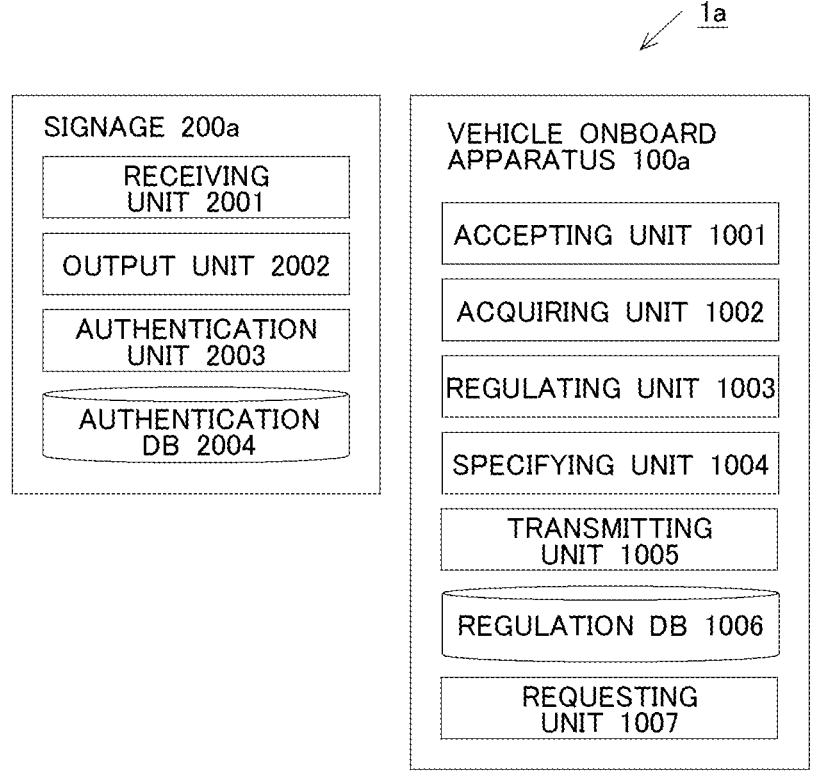
FIG. 6 shows exemplary logical configuration of a content output system according to a second embodiment.

FIG. 6 shows exemplary logical configuration of a content output system according to the second embodiment. The content output system 1a according to the second embodiment comprises a vehicle onboard apparatus 100a and a signage 200a.

The vehicle onboard apparatus 100a is different from the vehicle onboard apparatus 100 according to the first embodiment in that the vehicle onboard apparatus 100a has a requesting unit 1007. For example, the requesting unit 1007 transmits, to the signage 200a, authentication information exemplified by a user name and a password inputted by the aid of the input/output unit 105. The requesting unit 1007 receives an authentication result from the signage 200a to confirm the authentication result.

Figure 7:
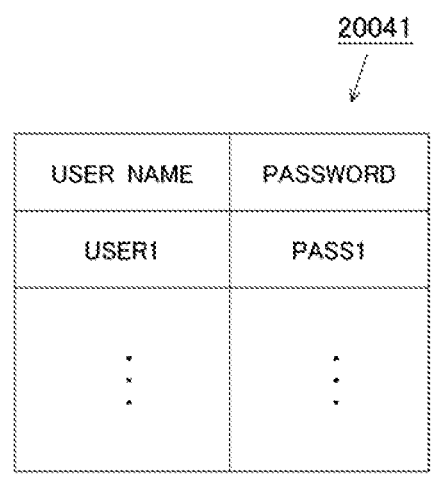

The signage 200a is different from the signage 200 according to the first embodiment in that the signage 200a has an authentication unit 2003 and an authentication database (referred to as "DB" in the drawing) 2004. FIG. 7 shows an exemplary authentication table stored in the authentication database. FIG. 7 shows an authentication table 20041 which adopts the set of the user name and the password as the authentication information, as an example of the authentication table. The authentication table 20041 includes respective items of "user name" and "password". Information, which is unambiguously given to each of the users to distinguish the user, is stored in "user name". The password, which is set for the user, is stored in "password".

With reference to FIG. 6 again, the authentication unit 2003 performs the authentication of the user on the basis of the authentication information received from the vehicle onboard apparatus 100a. In the authentication of the user, for example, the authentication unit 2003 extracts the user name and the password from the received authentication information. The authentication unit 2003 extracts the password correlated with the extracted user name, from the authentication table 20041. If the password included in the authentication information is coincident with the password extracted from the authentication table 20041, the authentication unit 2003 may judge that the authentication unit 2003 succeeds in the authentication. The authentication result, which indicates the success in authentication or the failure in authentication, is transmitted to the vehicle onboard apparatus 100a by the authentication unit 2003. If the authentication unit 2003 fails in the authentication, the signage 200a does not perform the output of the content, even if the content is received from the vehicle onboard apparatus 100a for which the authentication unit 2003 fails in the authentication.

<Exemplary Processing>

Figure 8:
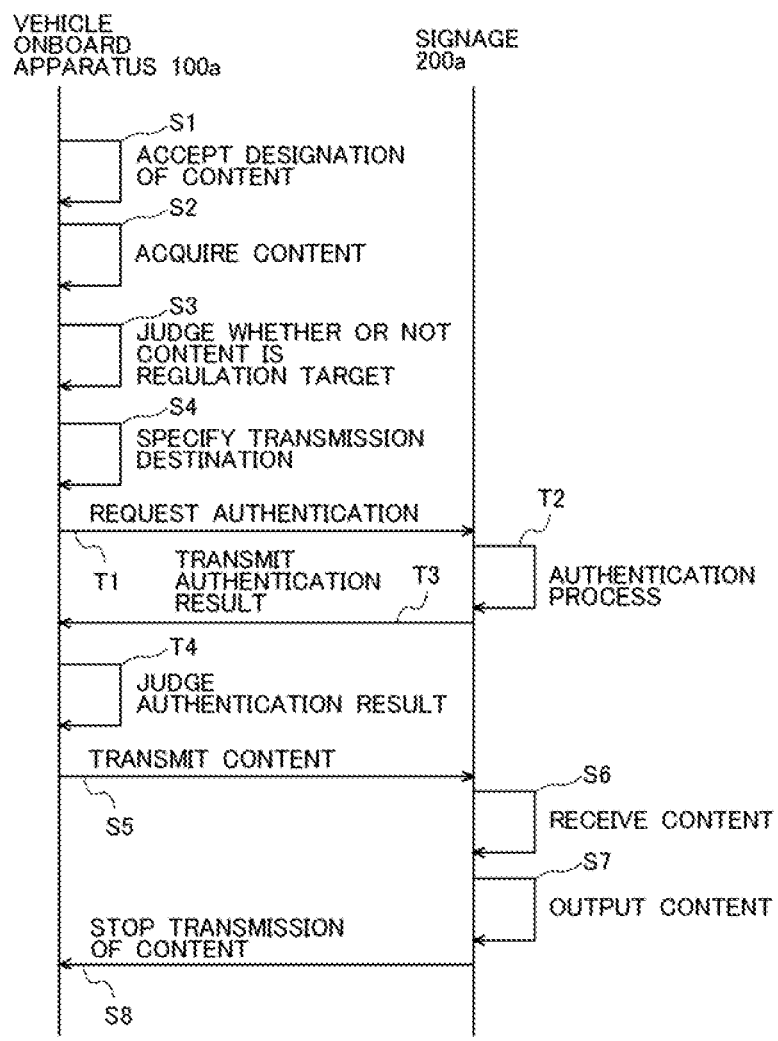
FIG. 8 shows an exemplary processing sequence of the content output system according to the second embodiment.

FIG. 8 shows an exemplary processing sequence of the content output system according to the second embodiment. The processes, which are the same as those of the first embodiment, are designated by the same reference numerals, any explanation of which will be omitted. An explanation will be made below with reference to FIG. 8 about the exemplary processing sequence of the content output system 1.

In T1, the authentication information, which is exemplified by the set of the user name and the password, is transmitted to the signage 200a specified in S4, by the requesting unit 1007 of the vehicle onboard apparatus 100a. The process of T1 is an example of "transmits authentication information to be used for the authentication of the user, to the specified output apparatus". In T2, the authentication unit 2003 of the signage 200a performs the authentication of the user by making reference to the authentication table 20041 on the basis of the received authentication information. In T3, the authentication unit 2003 transmits the authentication result to the vehicle onboard apparatus 100a. In T4, the requesting unit 1007 of the vehicle onboard apparatus 100a confirms the authentication result transmitted in T3. In the case of the success in the authentication, the content is transmitted to the signage 200a in accordance with the processes of S5 and the followings. In the case of the failure in the authentication, the requesting unit 1007 interrupts the process, and thus the transmission of the content to the signage 200a is not performed. Note that in the case of the failure in the authentication, the receiving unit 2001 of the signage 200a does not receive the content in S6, even if the content is transmitted from the vehicle onboard apparatus 100a for which the signage 200a failed in the authentication.

<Function and Effect of Second Embodiment>

In the second embodiment, the signage 200a does not receive the content from the vehicle onboard apparatus 100a for which the signage 200a failed in the authentication. Therefore, any content, which is transmitted from anyone other than the user who is permitted to utilize the signage 200a, is not outputted. Therefore, it is possible to suppress any unauthorized utilization of the signage 200a, and it is possible to reduce the processing load of the signage 200a.

In the second embodiment, the content is acquired in the processes of S1 and S2 shown in FIG. 8, and then the signage 200a, which is designated as the transmission destination, is specified in the process of S4. The authentication information is transmitted to the signage 200a specified in the process of T1. However, the process flow of the second embodiment is not limited to the order or sequence exemplified in FIG. 8. The signage 200a, which is designated as the transmission destination, may be specified by executing, for example, the process of S4 before acquiring the content in S2. Then, the authentication process may be performed by the signage 200a by transmitting the authentication information to the specified signage 200a, and the content may be acquired in accordance with the process of S2 in the case of the success in the authentication. If the order or sequence of the processes is adopted as described above, then it is thereby unnecessary to acquire the content in the case of the failure in the authentication, and the processing load of the vehicle onboard apparatus 100a is reduced.

Other Embodiments

The foregoing embodiment has been described by way of example in every sense. The present disclosure can be carried out while being appropriately changed within a range without deviating from the gist or essential characteristics thereof.

In the embodiment described above, the vehicle onboard apparatus 100 is provided with the regulation database 1006. However, any other apparatus may be provided with the regulation database 1006. For example, the signage 200 may be provided with the regulation database 1006, and the signage 200 may judge whether or not the received content is the regulation target. In this case, the signage 200 may stop the reproduction or playback of the content which is judged to be the regulation target. Note that the signage 200 does not move unlike the vehicle 10. Therefore, it is also allowable that the item of "area" is omitted in the regulation content table 10061 of the regulation database 1006. That is, each of the signages 200 may store, in the regulation content table 10061, the information for unambiguously distinguishing the content which is to be prohibited in the area in which the signage 200 is arranged.

In the embodiment described above, the regulation content table 10061 of the regulation database 1006 includes the respective items of "content ID" and "area". However, the regulation content table 10061 of the regulation database 1006 may further include any additional item. For example, the regulation content table 10061 may include information which indicates a range in which the content is the regulation target in relation to the content which is to be designated as the regulation target. For example, if the content, which is the regulation target, is the moving image or the voice, the range, in which the content is the regulation target, is indicated, for example, by a range of elapsed time starting from the playback (reproduction) start position. Further, if the content, which is the regulation target, is the image, the range, in which the content is the regulation target, is indicated, for example, by coordinates.

In the embodiment described above, the transmitting unit 1005 does not transmit the content which is judged to be the regulation target. However, the transmitting unit 1005 may transmit the content to the signage 200 by changing at least a part of the content which is judged to be the regulation target. The process for changing at least a part of the content is exemplified, for example, by the image processing including, for example, a mask process and a mosaic process for a part of the moving image or the image and the voice erasing processing for a part of the voice data. The phrase "at least a part" can be exemplified, for example, by the range in which the content is the regulation target, for example, if the regulation content table 10061 includes the information for indicating the range in which the content is the regulation target. The image processing including, for example, a mask process and a mosaic process for a part of the moving image or the image and the voice erasing processing for a part of the voice data is an example of "if the acquired content is a content stored in a storage unit by making reference to the storage unit which stores a list of contents for which output is suppressed, the controller transmits the acquired content to the output apparatus while changing at least a part of the acquired content".

In the embodiment described above, the vehicle onboard apparatus 100, which is carried on the vehicle 10, acquires the content, and the acquired content is allowed to be outputted by the signage 200. However, any apparatus or device other than the vehicle onboard apparatus 100 may acquire the content, and the acquired content may be allowed to be outputted by the signage 200. For example, a portable type information processing apparatus or device, which includes, for example, a smartphone, a tablet type computer, and a note type personal computer, may acquire the content, and the acquired content may be allowed to be outputted by the signage 200. When the portable type information processing apparatus or device is adopted, any user, who travels by any means other than the vehicle 10, can thereby utilize the content output system according to the embodiment.

The processes and the means explained in this disclosure can be carried out while freely combining them unless any technical contradiction or inconsistency arises.

Further, the process, which has been explained as being performed by one apparatus or device, may be executed by a plurality of apparatuses or devices in a shared manner. Alternatively, the process, which has been explained as being performed by the different apparatuses or devices, may be executed by one apparatus or device without causing any problem. In the computer system, it is possible to flexibly change the way of realization of the respective functions by means of any hardware configuration (server configuration).

In the embodiment, the content is outputted to the signage 200. However, the output destination of the content is not limited to the signage 200. For example, if the content is a voice, the output destination of the content may be a speaker which can receive the voice data and which can output the received voice data.

The present disclosure can be also realized such that a computer program, in which the functions explained in the foregoing embodiments are packaged, is supplied to a computer, and the program is read and executed by one or more processors possessed by the computer. The computer program as described above may be provided for the computer by means of any non-transitory computer-readable storage medium capable of being connected to a system bus of the computer, or the computer program may be provided for the computer by the aid of a network. The non-transitory computer-readable storage medium includes, for example, disks of arbitrary types such as magnetic disk (floppy (registered trademark) disk, hard disk drive (HDD) and the like), optical disk (CD-ROM, DVD disk, Blu-ray Disc and the like) and the like, read only memory (ROM), random access memory (RAM), EPROM, EEPROM, magnetic card, flash memory, optical card, and media of arbitrary types suitable for storing electronic commands.

What is claimed is:

1. An information processing apparatus to be used by a mobile user, the information processing apparatus comprising a controller which executes:
    acquisition of a content designated by the user;
    transmission of a predetermined signal to an output apparatus arranged on a traveling route of the user;
    reception of a response signal to the predetermined signal from the output apparatus;
    specification of the output apparatus based on the received response signal;
    acquisition of a current position of the information processing apparatus;
    when the content designated by the user is acquired, determination of whether the acquired content is a first suppression target content of a plurality of suppression target contents for which output is suppressed, the determination of whether the acquired content is the first suppression target content being performed based on a database, stored in a memory, that includes the plurality of suppression target contents and a plurality of suppression target areas for which output of content is suppressed;
    in response to determining that the acquired content is the first suppression target content, determination of whether the acquired current position of the information processing apparatus is located in a first suppression target area of the plurality of suppression target areas, the first suppression target area being correlated with the first suppression target content in the memory;
    transmission of the acquired content to the specified output apparatus in response to the acquired content not being determined to be the first suppression target content and the acquired current position of the information processing apparatus not being located in the first suppression target area; and
    suppression of the transmission of the acquired content to the output apparatus in response to the acquired content being determined to be the first suppression target content and the acquired current position of the information processing apparatus being located in the first suppression target area.

2. The information processing apparatus according to claim 1, wherein:
    the specified output apparatus outputs the content when the output apparatus succeeds in authentication of the user; and
    the controller transmits, to the specified output apparatus, authentication information to perform the authentication of the user.

3. The information processing apparatus according to claim 1, further comprising a plurality of output apparatuses, which are arranged on the traveling route of the user, the controller specifying the plurality of output apparatuses arranged in a traveling direction of the user.

4. The information processing apparatus according to claim 1, further comprising a plurality of output apparatuses, which are arranged on the traveling route of the user, the controller specifying an output apparatus of the plurality of output apparatuses, which is arranged at a position nearest to the user.

5. The information processing apparatus according to claim 1, wherein when the user passes by the specified output apparatus, the controller stops the transmission of the acquired content to the specified output apparatus.

6. An information processing method executed by an information processing apparatus to be used by a mobile user, the information processing method comprising:
    acquiring a content designated by the user;
    transmitting a predetermined signal to an output apparatus arranged on a traveling route of the user;
    receiving a response signal to the predetermined signal from the output apparatus;
    specifying the output apparatus based on the received response signal;
    acquiring a current position of the information processing apparatus;
    when the content designated by the user is acquired, determining whether the acquired content is a first suppression target content of a plurality of suppression target contents for which output is suppressed, the determination of whether the acquired content is the first suppression target content being performed based on a database, stored in a memory, that includes the plurality of suppression target contents and a plurality of suppression target areas for which output of content is suppressed;
    in response to determining that the acquired content is the first suppression target content, determining whether the acquired current position of the information processing apparatus is located in a first suppression target area of the plurality of suppression target areas, the first suppression target area being correlated with the first suppression target content in the memory;
    transmitting the acquired content to the specified output apparatus in response to the acquired content not being determined to be the first suppression target content and the acquired current position of the information processing apparatus not being located in the first suppression target area; and
    suppressing the transmission of the acquired content to the output apparatus in response to the acquired content being determined to be the first suppression target content and the acquired current position of the information processing apparatus being located in the first suppression target area.

7. A non-transitory storage medium stored with an information processing program for allowing an information processing apparatus to be used by a mobile user to execute:
    acquisition of a content designated by the user;
    transmission of a predetermined signal to an output apparatus arranged on a traveling route of the user;
    reception of a response signal to the predetermined signal from the output apparatus;
    specification of the output apparatus based on the received response signal;
    acquisition of a current position of the information processing apparatus;
    when the content designated by the user is acquired, determination of whether the acquired content is a first suppression target content of a plurality of suppression target contents for which output is suppressed, the determination of whether the acquired content is the first suppression target content being performed based on a database, stored in a memory, that includes the plurality of suppression target contents and a plurality of suppression target areas for which output of content is suppressed;

in response to determining that the acquired content is the first suppression target content, determination of whether the acquired current position of the information processing apparatus is located in a first suppression target area of the plurality of suppression target areas, the first suppression target area being correlated with the first suppression target content in the memory;

transmission of the acquired content to the specified output apparatus in response to the acquired content not being determined to be the first suppression target content and the acquired current position of the information processing apparatus not being located in the first suppression target area; and suppression of the transmission of the acquired content to the output apparatus in response to the acquired content being determined to be the first suppression target content and the acquired current position of the information processing apparatus being located in the first suppression target area.

* * * * *